US010372287B2

(12) United States Patent
Zhao et al.

(10) Patent No.: US 10,372,287 B2
(45) Date of Patent: Aug. 6, 2019

(54) HEADSET DEVICE AND VISUAL FEEDBACK METHOD AND APPARATUS THEREOF

(71) Applicant: Baidu Online Network Technology (Beijing) Co., Ltd., Beijing (CN)

(72) Inventors: Sicong Zhao, Beijing (CN); Jiawei Gu, Beijing (CN); Yunlong Zhang, Beijing (CN); Lei Li, Beijing (CN); Guang Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/504,078

(22) PCT Filed: Sep. 22, 2015

(86) PCT No.: PCT/CN2015/090242
§ 371 (c)(1),
(2) Date: Feb. 15, 2017

(87) PCT Pub. No.: WO2016/176950
PCT Pub. Date: Nov. 10, 2016

(65) Prior Publication Data

US 2018/0067623 A1 Mar. 8, 2018

(30) Foreign Application Priority Data

May 6, 2015 (CN) .......................... 2015 1 0226606

(51) Int. Cl.
*G06F 1/16* (2006.01)
*G06F 1/18* (2006.01)
(Continued)

(52) U.S. Cl.
CPC ....... *G06F 3/04812* (2013.01); *G02B 27/017* (2013.01); *G06F 1/163* (2013.01);
(Continued)

(58) Field of Classification Search
CPC .. G06F 3/04812; G06F 1/1686; G06F 3/0304; G06F 1/163; G06F 3/011;
(Continued)

(56) References Cited

U.S. PATENT DOCUMENTS

2014/0258902 A1 9/2014 Wheeler et al.
2015/0015461 A1 * 1/2015 Morimoto ............ G02B 27/017 345/8
2017/0236495 A1 * 8/2017 Braun .............. G08B 13/19621 348/158

FOREIGN PATENT DOCUMENTS

CN 102811769 A 12/2012
CN 104182051 A 12/2014
(Continued)

OTHER PUBLICATIONS

Definition of "nonvolatile", Merriam-Webster, retrieved from https://www.merriam-webster.com/dictionary/nonvolatile on Dec. 6, 2018 (Year: 2018).*
(Continued)

*Primary Examiner* — Timothy J Henn
(74) *Attorney, Agent, or Firm* — Nixon Peabody LLP

(57) ABSTRACT

A head worn equipment and visual feedback method and device thereof. The head worn equipment includes: a support frame, an image acquiring component, a display component, and a processor. The image acquiring component and the display component are disposed on the support frame. When the head worn equipment is in use, the display component is within a visual perception range of a user. The image acquiring component is configured to acquire a captured image. The processor acquires the captured image acquired by the image acquiring component, determines an indication color for display on the basis of the captured image, and controls the display component to display the
(Continued)

indication color, so as to indicate a viewing direction of the image acquiring component for the user.

15 Claims, 3 Drawing Sheets

(51) Int. Cl.

| | |
|---|---|
| ***G06F 3/00*** | (2006.01) |
| ***G06F 3/01*** | (2006.01) |
| ***G06F 3/03*** | (2006.01) |
| ***G09G 3/34*** | (2006.01) |
| ***G09G 5/00*** | (2006.01) |
| ***G02B 27/01*** | (2006.01) |
| ***H04R 5/033*** | (2006.01) |
| ***G06F 3/0481*** | (2013.01) |

(52) U.S. Cl.
CPC ............ *G06F 1/1686* (2013.01); *G06F 1/182* (2013.01); *G06F 3/005* (2013.01); *G06F 3/011* (2013.01); *G06F 3/0304* (2013.01); *G09G 3/3406* (2013.01); *G09G 5/003* (2013.01); *G06T 2207/10028* (2013.01); *H04R 5/0335* (2013.01); *H04R 2460/17* (2013.01)

(58) Field of Classification Search
CPC ......... G06F 3/005; G06F 1/182; G09G 5/003; G09G 3/3406; G02B 27/017; G06T 2207/10028; H04R 5/0335; H04R 2460/17
See application file for complete search history.

(56) References Cited

FOREIGN PATENT DOCUMENTS

| | | |
|---|---|---|
| CN | 104345802 A | 2/2015 |
| CN | 104834356 A | 8/2015 |

OTHER PUBLICATIONS

International Search Report corresponding to International Patent Application No. PCT/CN20151090242, State Intellectual Property Office of the P.R. China, dated Jan. 29, 2016; (2 pages).

* cited by examiner

HEADSET DEVICE AND VISUAL FEEDBACK METHOD AND APPARATUS THEREOF

CROSS-REFERENCE TO RELATED APPLICATIONS

This application is a U.S. National Stage of International Application No. PCT/CN2015/090242, filed Sep. 22, 2015, which claims the benefit of Chinese Patent Application No. 201510226606.1, filed May 6, 2015, both of which are incorporated herein by reference in their entireties.

TECHNICAL FIELD

The present disclosure relates to the field of electronic device technology, particularly to the field of wearable electronic device technology, and more particularly to a headset device and a visual feedback method and apparatus thereof.

BACKGROUND

With the continuous development of electronic technologies, various wearable devices have appeared. Currently, wearable smart headgears possess photographic and video functionalities. These wearable smart headgears are also in need of visual feedback functions. Visual feedback is an important means for human-machine interaction, which influences information transmission efficiencies and a user's interactive experience. The user may determine the target object (viewfinder orientation) shot by the current wearable smart headgear through visual feedback, and effectively adjust the shooting angle and direction of the wearable smart headgear.

A traditional headset device provides visual feedback by displaying a currently acquired viewfinder image. The flaw of this technology lies in that the viewfinder image of the visual feedback interferes with the user's view, resulting in poor usability.

SUMMARY

The present disclosure provides a headset device and a visual feedback method and apparatus thereof to solve the technical problems of mutual interference between the viewfinder image of the visual feedback and a user's view, and the poor usability in the current technology.

In a first aspect, the present disclosure provides a headset device, comprising a frame, an image acquisition component, a display assembly and a processor; the image acquisition component and the display component arranged on the frame, and the display component positioned within visual perception reach of a user when the headset device is in use; the image acquisition component used to acquire a viewfinder image; the processor obtaining the viewfinder image acquired by the image acquisition component, determining an indication color to be displayed based on the viewfinder image, and controlling the display component to display the indication color in order to indicate the viewfinder orientation of the image acquisition component to the user.

In some embodiments, the processor is configured to obtain a color value of each pixel within a preset area in the viewfinder image, and determine the indication color based on the color value of the each pixel within the preset area.

In some embodiments, the processor determines the color value shown by most pixels in the preset area as the color value of the indication color; or the processor determines a mean color value of pixels in the preset area as the color value of the indication color.

In some embodiments, the preset area refers to an area in a center of the viewfinder image.

In some embodiments, the display component comprises a full-color LED lamp or a full-color display screen.

In some embodiments, the full-color display screen comprises at least one of: a full-color LED display screen and a full-color OLED display screen.

In a second aspect, the present disclosure provides a headset device, comprising a frame, an image acquisition component, a display component and a communication unit; the image acquisition component and the display component arranged on the frame, the display component is positioned within visual perception reach of a user when the headset device is in use; the image acquisition component configured to acquire a viewfinder image; the communication unit configured to transmit the viewfinder image acquired by the image acquisition component to a cloud processor, the cloud processor determining an indication color to be displayed based on the viewfinder image, and to receive determined information on the indication color sent by the cloud processor; and the display component used to display the indicator color based on the information of the indicator color in order to indicate the viewfinder orientation of the image acquisition component to the user.

In a third aspect, the present disclosure provides a visual feedback method used in a headset device, the method comprises: obtaining an acquired viewfinder image; determining an indication color to be displayed based on the viewfinder image; and displaying the indicator color in order to indicate the viewfinder orientation to the user.

In some embodiments, the determining an indication color to be displayed based on the viewfinder image comprises: obtaining a color value of each pixel within a preset area in the viewfinder image; and determining the indication color based on the color value of each pixel within the preset area.

In some embodiments, the determining the indication color based on the color value of each pixel within the preset area comprises: determining the color value shown by most pixels in the preset area as the color value of the indication color; or determining a mean color value of pixels in the preset area as the color value of the indication color.

In some embodiments, a full-color LED or a full-color display screen is adopted to display the indication color.

In a fourth aspect, the present disclosure provides a visual feedback apparatus used for the headset device, the apparatus comprises an obtaining unit, configured to obtain an acquired viewfinder image; a determining unit, configured to determine an indication color to be displayed based on the viewfinder image; and a displaying unit, configured to display the indicator color in order to indicate the viewfinder orientation to the user.

In some embodiments, the determining unit comprises a color value acquiring subunit, configured to obtain a color value of each pixel within a preset area in the viewfinder image; and an indication color determining subunit, configured to determine the indication color based on the color value of each pixel within the preset area.

In some embodiments, the indication color determining subunit is configured to determine the color value shown by most pixels in the preset area as the color value of the indication color; or to determine a mean color value of pixels in the preset area as the color value of the indication color.

The headset device and visual feedback method and apparatus thereof according to the present disclosure achieve the purpose to indicate a viewfinder orientation to a user by displaying to the user an indication color determined based on the acquired viewfinder image, solve the problem of interference between the viewfinder image of the visual feedback in the headset device and the user's view, and improve the information transmission efficiency.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

The wearable device in the present disclosure has photographic and/or video functions. For the purpose of illustrative and concise description, the present disclosure will be described below in combination with a wearable device having photographic and/or video functions. The headset device may comprise but not limited to smart glasses, a headset digital camera, and a smart helmet.

Figure 1:
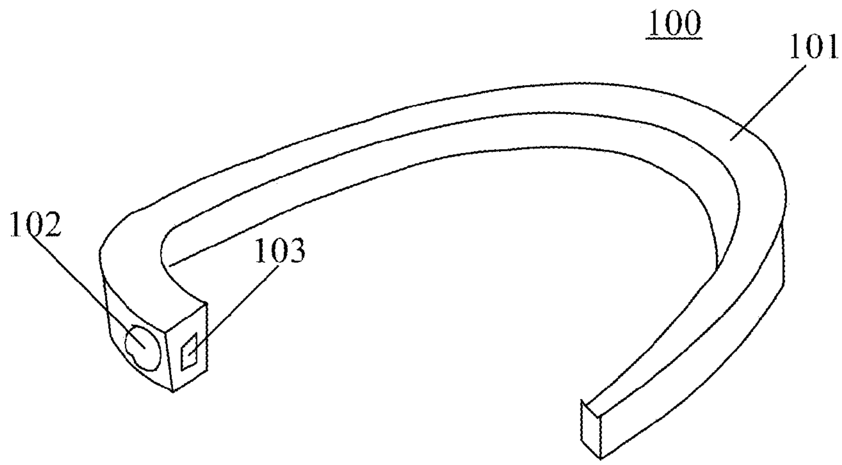
FIG. 1 is an illustrative structural diagram of a wearable device according to an embodiment of the present disclosure.

FIG. 1 shows an illustrative structure of a wearable device of the present disclosure.

As shown in FIG. 1, the headset device 100 comprises a frame 101, an image acquisition component 102, a display component 103 and a processor (not shown). The image acquisition component 102 and the display component 103 are arranged on the frame 101, and when the headset device 100 is in use, the display component 103 is positioned within a user's visual perception reach. The image acquisition component 102 is configured to acquire a viewfinder image. The processor obtains the viewfinder image acquired by the image acquisition component 102, determines an indication color to be displayed based on the viewfinder image, and controls the display component 103 to display the indication color in order to indicate the viewfinder orientation of the image acquisition component 102 to the user.

In the present embodiment, in addition to the frame 101, image acquisition component 102, display component 103 and processor, the headset device 100 may further comprise glasses, a recording component, a speaker, and other components and/or assemblies. It should be appreciated that the headset device 100 may further comprises other components and/or assemblies. The various components and/or assemblies included in the headset device 100 may be either fixedly or adjustably arranged on the frame 101. It should be appreciated that the present disclosure does not limit ways that various components and/or assemblies included in the headset device are arranged on the frame.

The image acquisition component 102 is configured to acquire a viewfinder image. Specifically, while taking a photo or a video, a view needs to be first found in real-time through the image acquisition component 102, namely, by obtaining multiple frames of viewfinder images per second, (such as obtaining 12 frames or 24 frames of viewfinder images per second). In the existing technology, the viewfinder image is taken directly as a visual feedback image and displayed on a viewfinder screen for the user to browse. If the user is satisfied with the viewfinder image, she may execute a shooting operation to take a photo or a video corresponding to the viewfinder image.

It should be noted that, when taking a photo or video, the photographer usually intends to photograph the focus of attention (such as people and objects to be photographed) within a certain area in the center of the photo or video image. However, whether the focus of attention is photographed within a certain area in the photo or video image center depends on the viewfinder orientation of the image acquisition component, i.e., the photographic direction and angle of the image acquisition component.

For a headset device having a photographic and/or video function, on one hand, the image acquisition component is fixed at a certain position. The user may generally estimate a likely bound of viewfinder orientation based on the fixed position. On the other hand, the colors in one's surrounding area are usually plentiful. If the color in a certain area (e.g. an area in the center) in the viewfinder image can be learned, combined with the above-mentioned fixed position of the image acquisition component, the user may estimate the viewfinder orientation of the image acquisition component.

Figure 2:
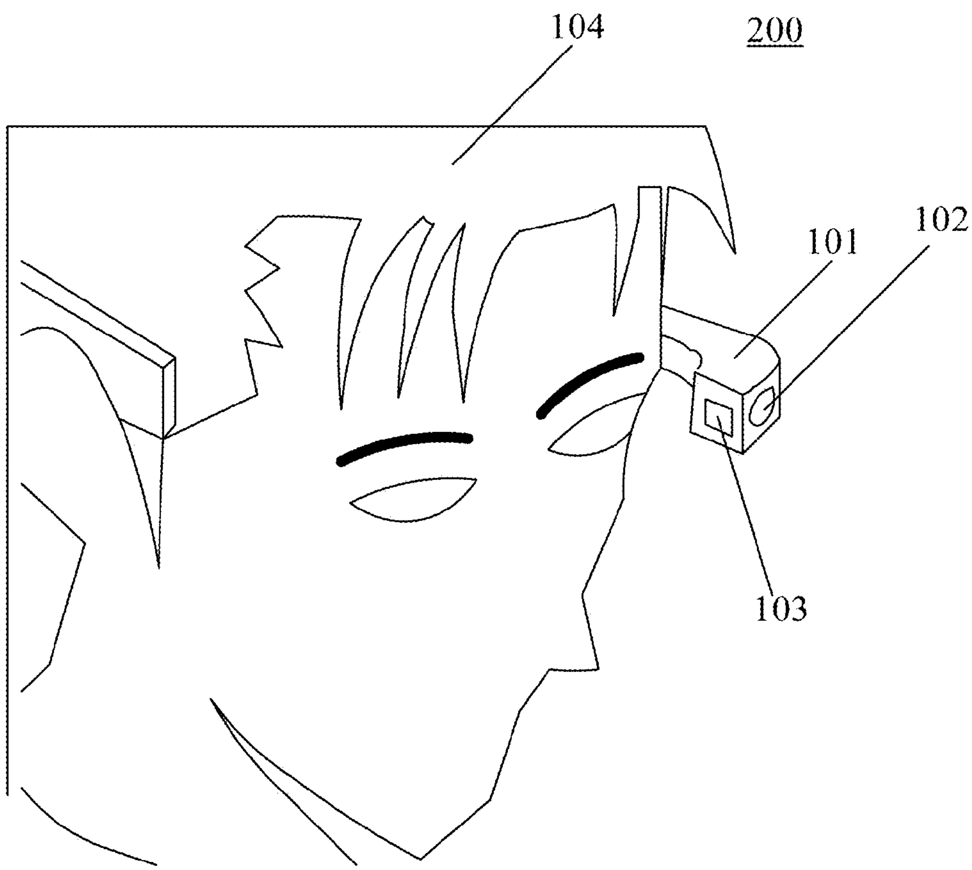
FIG. 2 is a schematic diagram of a wearable device in use according to an embodiment of the present disclosure.

Therefore, in the present embodiment, the image acquisition component transmits the viewfinder image to the processor after acquiring the viewfinder image. The processor analyzes and processes the acquired viewfinder image and determines the indication color for visual feedback. Subsequently, the processor subjects the display component to display the indication color to indicate the viewfinder orientation of the image acquisition component to the user. For example, as shown in FIG. 2, when the headset device is in use, the image acquisition component 102 is located above the left eye of the user 104, and the user 104 may generally determine that the viewfinder orientation is within a certain range in front of the left eye based on the position of the image acquisition component 102. Further, the user 104 may determine the viewfinder orientation based on the indication color displayed by the display component 103. If the colors in many areas in front of the left eye of the user 104 are similar to the indication color, the user is temporarily unable to determine the viewfinder orientation based on the indication color of the visual feedback. At this moment, the user may slowly adjust the viewfinder direction of the image acquisition component 102 and determine the viewfinder orientation based on the changing conditions of the indication color.

It should be noted that, when the headset device is in use, the display component should be within the user's visual perception reach, and since the display component displays the color, the user does not need to identify the image. Therefore, on one hand, when the headset device is in use, the display component only needs to display a color that is within the user's visual color perception reach. On the other hand, the display component can be made much smaller than a display screen for displaying the viewfinder image in the existing technologies, as long as the user can identify the color displayed by the display component. Therefore, even though the display component of the present disclosure and the display screen for displaying a viewfinder image in existing technologies are made of the same materials, the headset device of the present disclosure has the advantage of better power efficiency due to its smaller size.

The headset device according to the present disclosure achieves the purpose of indication for the user a viewfinder orientation of the image acquisition component by displaying the indication color determined based on the acquired viewfinder image to the user, solves the problem of interference between the viewfinder image of the visual feedback for the headset device and the user's view, and improves the information transmission efficiency.

In one implementation of some optional embodiments, the display component may be a full-color display screen able to display true colors of an object, such as a full-color LED display screen or a full-color OLED display screen. In another implementation, the display component could further be a full-color LED. By controlling three LED chips, red, green and blue (R, G, B), and using the optical principle of three-primary colors (by mixing the primary colors—red, green and blue—based on a certain proportion, all colors can be generated), almost all colors visible to human eyes can be produced. In the present implementation, the adoption of a full-color LED saves more power, reduces power consumption of the headset device, and extends the cruising duration.

In some optional embodiments, the processor is configured to obtain the color value of each pixel within a preset area in the viewfinder image, and determining an indication color based on the color value of the each pixel within the preset area.

In the present embodiment, after obtaining the viewfinder image acquired by the image acquisition component, the processor determines the indication color to be displayed based on the viewfinder image. Specifically, the processor first obtains the color value of each pixel within a preset area in the viewfinder image. Herein, the preset area refers to an area in a center of the viewfinder image, i.e., the center of the preset area is the center of the viewfinder image. In an implementation, the preset area may take the center of the viewfinder image as its center, which is a round area comprising a preset number of pixels. For example, the preset area may take the center of the viewfinder image as its center, which is a round area comprising 1600 pixels. In another implementation, the preset area may take the center of the viewfinder image as its center, which is a rectangle area comprising a preset number of pixels. For example, the preset area may take center of the viewfinder image as its center, which is a rectangle area comprising 1600 pixels. It should be appreciated that the present disclosure does not limit any specific shape or size of the preset area.

The processor then determines the indication color based on the color value of each pixel within the preset area. Specifically, in an implementation, by analyzing the color value of each pixel within the preset area in the viewfinder image, the processor determines the color value shown by the most pixels in the preset area as the color value of the indication color. In another implementation, the processor may further calculate a mean value of the color values within the preset area in the viewfinder image, and determine the mean value as the color value of the indication color. In yet another implementation, the processor may further acquire a color distribution histogram within the preset area in the viewfinder image, and determine the color value of the indication color based on the distribution of the colors in the viewfinder image. It should be appreciated that there are other approaches to determine the indication color.

In some other optional embodiments, the headset device comprises a frame, an image acquisition component, a display component and a communication unit. The image acquisition component and the display component are arranged on the frame. When the headset device is in use, the display component is positioned within a user's visual perception reach. The image acquisition component is configured to acquire a viewfinder image. The communication unit is configured to transmit the viewfinder image acquired by the image acquisition component to a cloud processor, which determines the indication color to be displayed based on the viewfinder image, and receives information determining the indication color sent by the cloud processor. The display component is configured to display the indication color according to the information to indicate the viewfinder orientation of the image acquisition component to the user. Herein, the information of the indication color is information that can identify the indication color, such as the name of the indication color, the identification information of the indication color, and the color value of the indication color.

In the present embodiment, the communication unit of the headset device may transmit the viewfinder image acquired by the image acquisition component to the cloud processor, which determines the indication color to be displayed based on the viewfinder image. Therefore, in the present embodiment, the determining the indication color to be displayed is conducted by the cloud processor, which determines the indication color and returns the result to the headset device through the communication unit of the headset device. The cloud processor, for example, may be a remote server, or an authenticated smart mobile electronic device of the user, such as a mobile phone, or a tablet PC.

Comparing to the embodiment corresponding to FIG. 1, the headset device of the present embodiment is not equipped with a processor, but transmits a viewfinder image acquired by the acquisition component to the cloud processor through the communication unit, receives a result sent from the cloud processor, and displays the indication color based on the result to realize a visual feedback of the headset device.

It should be appreciated that the structure of the headset device described in the present embodiment may refer to the various structures in the headset device as illustrated in FIGS. 1-2. Thus, the various structural parts and particular technical features of the headset device as described above are also applicable to the headset device of the present embodiment and need not to be repeated herein.

Figure 3:
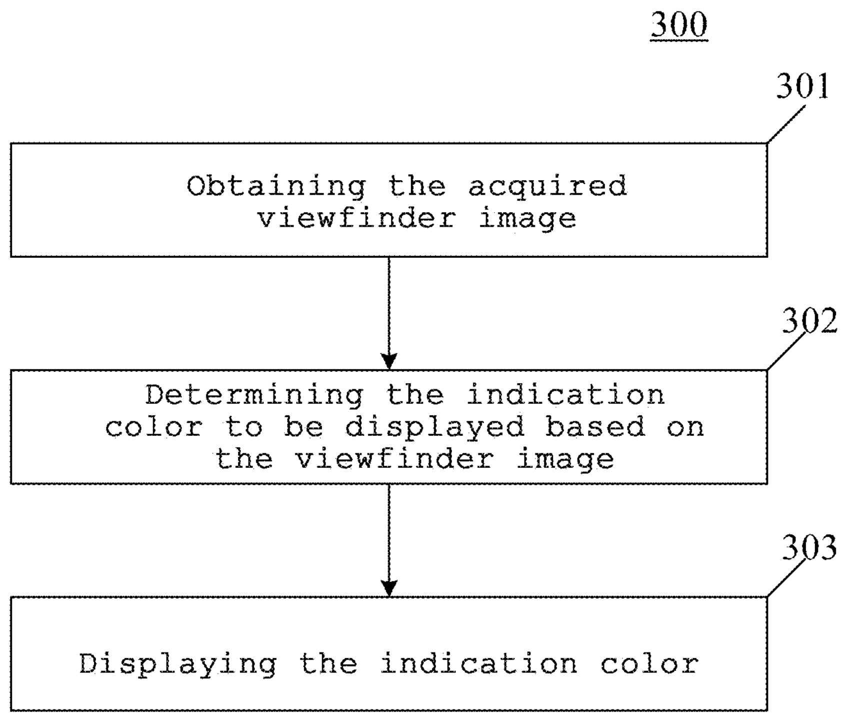
FIG. 3 is a flowchart of a visual feedback method used in a headset device according to an embodiment of the present disclosure.

With further reference to FIG. 3, showing a flow 300 of an embodiment of a visual feedback method of a headset device according to the present disclosure.

As shown in FIG. 3, at step 301, the acquired viewfinder image is obtained.

Then, at step 302, the indication color to be displayed is determined based on the viewfinder image.

Lastly, at step 303, the indication color is displayed to indicate the viewfinder orientation to the user.

Generally, while taking a photo or a video, the user needs to find a real-time view first, that is, to obtain multiple frames of viewfinder images per second. In the existing technologies, the viewfinder image is directly taken as a visual feedback image and is displayed on a viewfinder screen for the user to navigate. However, the objects surrounding the user are usually colorful, if the color in a certain area (such as the center area) in the viewfinder image can be obtained, the user may generally determine the viewfinder orientation by combining this information with the position of an element (such as the lens) that acquires the viewfinder image. In the preset embodiment, after acquiring the viewfinder image, the device analyzes and processes the acquired viewfinder image, determines an indication color for the visual feedback, and displays the indication color to indicate the viewfinder orientation to the user.

In the present embodiment, a full-color LED or a full-color display screen may be adopted to display the indication color.

Figure 4:
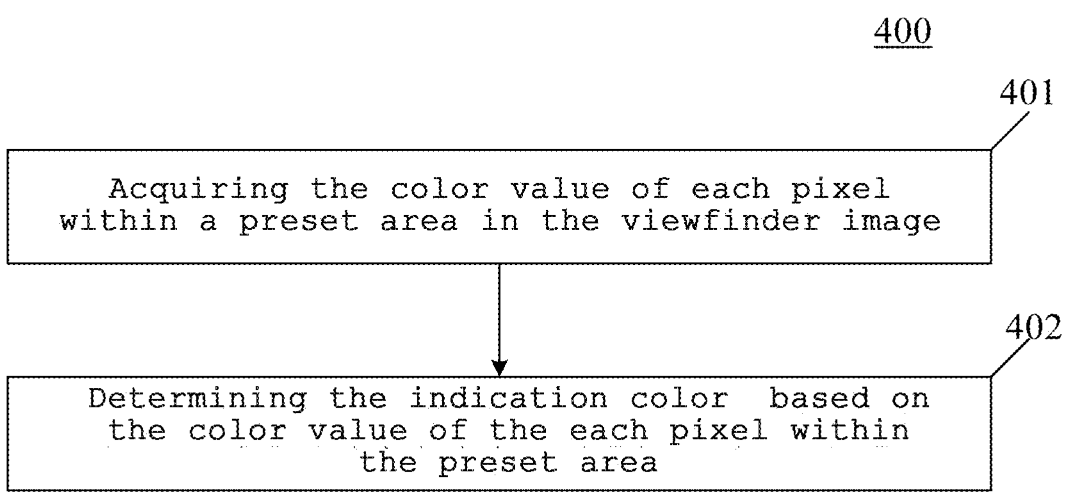
FIG. 4 is a flowchart of a method for determining the indication color to be displayed based on the viewfinder image according to an embodiment of the present disclosure.

FIG. 4 further shows a flowchart 400 of a method for determining the indication color to be displayed based on the viewfinder image according to an embodiment of the present disclosure.

As shown in FIG. 4, at step 401, the color value of each pixel within a preset area in the viewfinder image is acquired.

At last, at step 402, the indication color is determined based on the color value of the each pixel within the preset area.

Specifically, in the present embodiment, the color value of each pixel within a preset area in the viewfinder image is first obtained. Here, the preset area may refer to an area in a center of the viewfinder image (i.e., the center of the preset area is the center of the viewfinder image). The present disclosure does not limit to any specific shape or size of the preset area.

The indication color is then determined based on the color value of the each pixel within the preset area. In particular, in one implementation, by analyzing the color value of the each pixel within the preset area in the viewfinder image, the color value shown by the most pixels in the preset area is determined as the color value of the indication color. In another implementation, a mean value of the color values within the preset area in the viewfinder image may be calculated and determined as the color value of the indication color. In a third implementation, a color distribution histogram within the preset area in the viewfinder image may be acquired, and the color value of the indication color may be determined based on distribution of the colors in the viewfinder image. It should be appreciated that there are other approaches to determine the indication color.

It should be noted that, although the operations of the method in the present disclosure are described in a particular order in the drawings, it does not require or imply that these operations must be executed according to the specific order, or the expected result can only be achieved by executing all described operations. On the contrary, the order of executing e steps described in the flowchart can be changed. Additionally or alternatively, some steps may be omitted, multiple steps may be combined into one for execution, and/or one step may be divided into several steps for execution.

Figure 5:
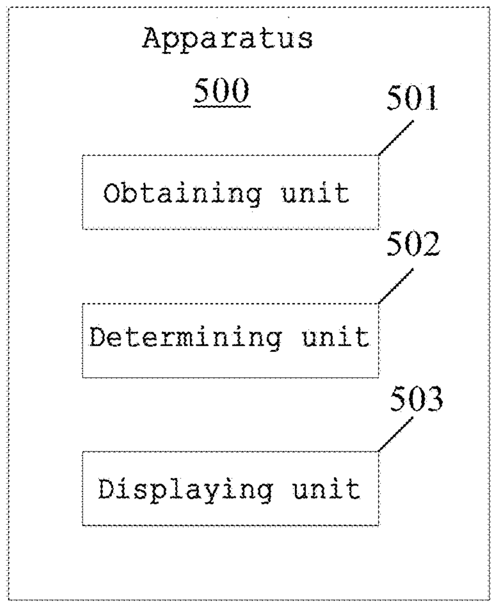
FIG. 5 is a structural diagram of a visual feedback apparatus of a headset device according to an embodiment of the present disclosure.

FIG. 5 further shows a structural diagram of an embodiment of a visual feedback apparatus in a headset device based on the present disclosure.

As shown in FIG. 5, the apparatus 500 of the present embodiment comprises an obtaining unit 501, a determining unit 502 and a displaying unit 503. The obtaining unit 501 is configured to obtain the acquired viewfinder image. The determining unit 502 is configured to determine the indication color to be displayed based on the viewfinder image. The displaying unit 503 is configured to display the indication color to indicate the viewfinder orientation to the user.

In some optional embodiments, the determining unit 502 comprises a color value obtaining subunit and an indication color determining subunit (not shown). The color value obtaining subunit is configured to obtain color value of each pixel within a preset area in the viewfinder image. The indication color determining subunit is configured to determine the indication color based on the color value of the each pixel within the preset area.

In some optional embodiments, the indication color determining subunit is configured to determine the color value shown by the most pixels in the preset area as the color value of the indication color. The indication color determining subunit is alternatively configured to determine a mean color value of pixels in the preset area as the color value of the indication color.

It should be appreciated that, all units and modules in the apparatus 500 correspond to the various structures of the headset device and the various steps of the method as described in FIGS. 1-4. Thus, the description to the various structures of the headset device and operations and features described in the method may also apply to the apparatus 500 and units comprised therein. The apparatus 500 may be set in the headset device in advance, or loaded in the headset device by means of downloading or other means. The correspondent units in the apparatus 500 and those in the headset device may coordinate with each other to realize the schemes used for the visual feedback of the headset device.

Figure 6:
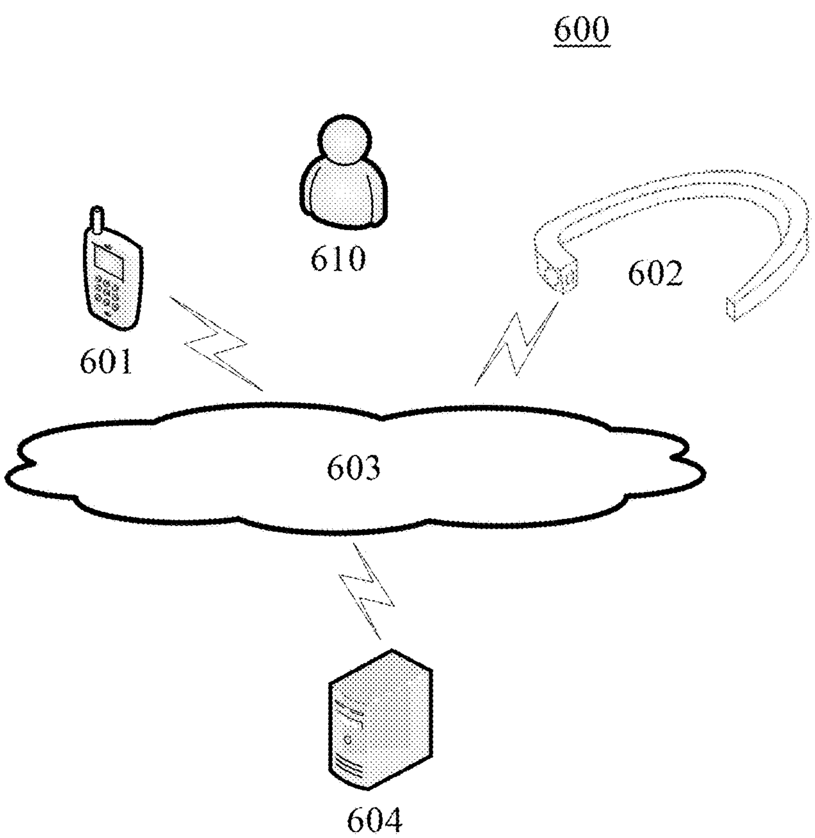
FIG. 6 is an architectural diagram of an exemplary system in which the present disclosure may be implemented.

FIG. 6 shows an exemplary architecture of a system 600 to which may be used by the present disclosure.

As shown in FIG. 6, the system ARCHITECTURE 600 MAY INCLUDE a terminal device 601, a headset device 602, a network 603 and a server 604. The network 603 serves as a medium providing a communication link between the terminal device 601, the headset device 602 and the server 604. The network 603 may include various types of connections, such as wired or wireless transmission links, or optical fibers.

The user 610 may use the terminal device 601 and the headset device 602 to interact with the server 604 through the network 603, in order to receive or transmit a message, etc. The terminal device 601 may be equipped with various communication client applications, such as instant messaging tools, mailbox clients, social platform software, etc.

The terminal device 601 may be various electronic devices, including but not limited to personal computers, smart phones, smart watches, tablet computers, personal digital assistants. The headset device 602 may be various devices having photographic and/or video functions, including but not limited to, smart glasses, headset digital cameras, smart helmets.

The server 604 may be a server providing various service. The server may store and analyze received data and feedback the processing result to the headset device.

It should be noted that, the visual feedback method used for the headset device provided in the embodiments of the present disclosure may be executed by the headset device 602, and may also be executed by the terminal device 601 or the server 604. The visual feedback device used for the headset device can be arranged in the headset device 602, and may also be arranged in the terminal device 601 or the server 604. In some embodiments, the step of determining the indication color to be displayed based on the viewfinder image may be executed in the server 604 or the terminal device 601, and may also be executed in the headset device 602. For example, while the indication color to be displayed is determined based on the viewfinder image, if the network 603 runs unobstructed, the server 604 or the terminal device 601 may determine or return information of the indication color; if there is no network or network 603 is obstructed, the indication color may be determined in the headset device 602.

It should be appreciated that, the number of the terminal device, headset device, network and server shown in FIG. 6 is just illustrative. According to implementation demand, any number of the terminal device, network and server may be equipped.

The units or modules involved in the embodiments of the present disclosure may be implemented by way of software or hardware. The described units or modules may also be provided in a processor, for example, described as: a processor, comprising an obtaining unit, a determining unit and a display unit, where the names of these units or modules are not considered as a limitation to the units or modules. For example, the obtaining unit may also be described as "a unit for obtaining acquired viewfinder images."

In another aspect, the present disclosure further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to execute the visual feedback method for headset devices described in the present disclosure.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present disclosure with (but not limited to), technical features with similar functions.

What is claimed is:

1. A headset device, comprising a frame, an image acquisition component, a display component and a processor;

the image acquisition component and the display component arranged on the frame, the display component positioned within visual perception reach of a user when the headset device is in use;

the image acquisition component configured to acquire a viewfinder image; and the processor obtaining the viewfinder image acquired by the image acquisition component, determining an indication color to be displayed by analyzing and processing the viewfinder image, and controlling the display component to display the indication color to indicate a viewfinder orientation of the image acquisition component to the user.

2. The headset device according to claim 1, wherein the processor is configured to:

obtain a color value of each pixel within a preset area in the viewfinder image; and determine the indication color based on the color value of the each pixel within the preset area.

3. The headset device according to claim 2, wherein the processor determines the color value shown by most pixels in the preset area as the color value of the indication color; or the processor determines a mean color value of pixels in the preset area as the color value of the indication color.

4. The headset device according to claim 2, wherein the preset area is an area in a center of the viewfinder image.

5. The headset device according to claim 1, wherein the display component comprises a full-color LED or a full-color display screen.

6. The headset device according to claim 5, wherein the full-color display screen comprises at least one of: a full-color LED display screen and a full-color OLED display screen.

7. A headset device, comprising a frame, an image acquisition component, a display component and a communication unit;

the image acquisition component and the display component arranged on the frame, and when the headset device is in use, the display component positioned within visual perception reach of a user;

the image acquisition component configured to acquire a viewfinder image;

the communication unit configured to transmit the viewfinder image acquired by the image acquisition component to a cloud processor, the cloud processor determining the indication color to be displayed based on the viewfinder image, and to receive information for determining the indication color sent by the cloud processor; and the display component configured to display the indicator color based on the information, in order to indicate the viewfinder orientation of the image acquisition component to the user.

8. A visual feedback method used in a headset device, comprising:

obtaining an acquired viewfinder image;

determining an indication color to be displayed by analyzing and processing on the viewfinder image; and displaying the indication color in order to indicate the viewfinder orientation to the user.

9. The method according to claim 8, the determining an indication color to be displayed based on the viewfinder image comprising:

obtaining a color value of each pixel within a preset area in the viewfinder image; and determining the indication color based on the color value of the each pixel within the preset area.

10. The method according to claim 9, the determining the indication color based on the color value of each pixel within the preset area comprising:

determining the color value shown by most pixels in the preset area as the color value of the indication color; or determining a mean color value of pixels in the preset area as the color value of the indication color.

11. The method according to claim 8, wherein a full-color LED or a full-color display screen is adopted to display the indication color.

12. A visual feedback apparatus used for a headset device, comprising:

an obtaining unit, configured to obtain an acquired viewfinder image;

a determining unit, configured to determine the indication color to be displayed based on the viewfinder image; and a displaying unit, configured to display the indicator color in order to indicate the viewfinder orientation to the user.

13. The apparatus according to claim 12, wherein the determining unit comprises:

a color value obtaining subunit, configured to obtain a color value of each pixel within a preset area in the viewfinder image; and an indication color determining subunit, configured to determine the indication color based on the color value of each pixel within the preset area.

14. The apparatus according to claim 13, wherein the indication color determining subunit is configured to:

determine the color value shown by most pixels in the preset area as the color value of the indication color; or determine a mean color value of pixels in the preset area as the color value of the indication color.

15. A non-transitory computer storage medium, storing one or more programs, when the one or more programs are executed by a device, the nonvolatile computer storage medium enables the device to:

obtain an acquired viewfinder image;

determine an indication color to be displayed by analyzing and processing the viewfinder image; and display the indication color in order to indicate the viewfinder orientation to the user.

* * * * *